US012555508B2

(12) United States Patent
Wang et al.

(10) Patent No.: US 12,555,508 B2
(45) Date of Patent: Feb. 17, 2026

(54) DISPLAY APPARATUS AND LUMINANCE ADJUSTMENT METHOD THEREFOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenbo Wang, Beijing (CN); Jianting Wang, Beijing (CN); Rui Guo, Beijing (CN); Tianyang Han, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/862,049

(22) PCT Filed: Aug. 30, 2022

(86) PCT No.: PCT/CN2022/115798
§ 371 (c)(1),
(2) Date: Oct. 31, 2024

(87) PCT Pub. No.: WO2024/044957
PCT Pub. Date: Mar. 7, 2024

(65) Prior Publication Data
US 2025/0182663 A1 Jun. 5, 2025

(51) Int. Cl.
*G09G 3/20* (2006.01)
*G09G 3/34* (2006.01)

(52) U.S. Cl.
CPC ......... *G09G 3/2007* (2013.01); *G09G 3/3406* (2013.01); *G09G 2320/0276* (2013.01);
(Continued)

(58) Field of Classification Search
CPC ............... G09G 3/2007; G09G 3/3406; G09G 2320/0276; G09G 2320/0666;
(Continued)

(56) References Cited

U.S. PATENT DOCUMENTS 9,077,994 B2 * 7/2015 Miller ....................... G06F 3/14
10,242,650 B2 * 3/2019 Miller ....................... G06F 3/14
(Continued)

FOREIGN PATENT DOCUMENTS

CN 103426393 A 12/2013
CN 204143442 U 2/2015
(Continued)

*Primary Examiner* — Michael J Jansen, II
(74) *Attorney, Agent, or Firm* — The Webb Law Firm

(57) ABSTRACT

A display apparatus includes an input device, a processor and an output device. The input device is configured to obtain initial gray scales of a display image. The processor is coupled to the input device and configured to adjust the initial gray scales of the display image by using a first display data look-up table (LUT). The output device includes a display module. The output device is coupled to the processor, and configured to output a color-adjusted display image. The color-adjusted display image meets the Digital Imaging and Communications in Medicine (DICOM) Grayscale Standard Display Function (GSDF) standard, and a value of a contrast response of the color-adjusted display image is less than or equal to 11%.

18 Claims, 6 Drawing Sheets

(52) U.S. Cl.
CPC ............... *G09G 2320/0666* (2013.01); *G09G 2320/0673* (2013.01); *G09G 2320/0693* (2013.01); *G09G 2380/08* (2013.01)

(58) Field of Classification Search
CPC ... G09G 2320/0673; G09G 2320/0693; G09G 2380/08; G09G 3/20; G09G 3/2003; G09G 5/10; G09F 9/00
See application file for complete search history.

(56) References Cited

U.S. PATENT DOCUMENTS

| | | | | |
|---|---|---|---|---|
| 10,679,582 B2 * | 6/2020 | Ninan | H04N 5/202 | |
| 11,367,413 B2 * | 6/2022 | Tsubokura | G09G 5/10 | |
| 2006/0209056 A1 * | 9/2006 | Willis | G09G 3/2081 | 345/204 |
| 2014/0139541 A1 * | 5/2014 | Willaert | G09G 5/003 | 345/184 |
| 2014/0363093 A1 * | 12/2014 | Miller | H04N 19/40 | 382/235 |
| 2018/0240437 A1 * | 8/2018 | Miller | G06F 3/14 | |
| 2018/0261184 A1 * | 9/2018 | Ninan | G09G 5/005 | |
| 2021/0241718 A1 * | 8/2021 | Tsubokura | G09G 5/10 | |
| 2025/0182663 A1 * | 6/2025 | Wang | G09G 3/20 | |

FOREIGN PATENT DOCUMENTS

| | | | |
|---|---|---|---|
| CN | 104392424 | A | 3/2015 |
| CN | 204204383 | U | 3/2015 |
| CN | 105047121 | A | 11/2015 |
| CN | 106157904 | A | 11/2016 |
| CN | 205827834 | U | 12/2016 |
| CN | 106354467 | A | 1/2017 |
| CN | 106357766 | A | 1/2017 |
| CN | 105023545 | B | 2/2018 |
| CN | 108877735 | A | 11/2018 |
| CN | 110827734 | A | 2/2020 |
| CN | 113853647 | A | 12/2021 |
| CN | 114822448 | A | 7/2022 |

* cited by examiner

DISPLAY APPARATUS AND LUMINANCE ADJUSTMENT METHOD THEREFOR

CROSS-REFERENCE TO RELATED APPLICATION

This application is the United States national phase of International Patent Application No. PCT/CN2022/115798, filed Aug. 30, 2022, the disclosure of which is hereby incorporated by reference in its entirety.

BACKGROUND OF THE INVENTION

Field of the Invention

The present disclosure relates to the field of display technologies, and in particular, to a display apparatus and a luminance adjusting method therefor.

Description of Related Art

Display apparatuses need to undergo GAMMA Correction before leaving the factory, so that images displayed by the display apparatuses meet viewing habits of human eyes. For medical display apparatuses, in addition to GAMMA Correction, Digital Imaging and Communications in Medicine (DICOM) calibration is required to ensure consistency of medical images displayed by different display apparatus.

SUMMARY OF THE INVENTION

In an aspect, a display apparatus is provided. The display apparatus includes an input device, a processor and an output device. The input device is configured to obtain initial gray scales of a display image. The processor is coupled to the input device and configured to adjust the initial gray scales of the display image by using a first display data look-up table (LUT). The output device includes a display module. The output device is coupled to the processor, and configured to output a color-adjusted display image. The color-adjusted display image meets the Digital Imaging and Communications in Medicine (DICOM) Grayscale Standard Display Function (GSDF) standard, and a value of a contrast response of the color-adjusted display image is less than or equal to 11%.

In some embodiments, the first LUT includes at least one first LUT value, and the at least one first LUT value satisfies a following relationship:

$$K(j) = \left(L(j) - \frac{L_{min} * (1 - j/j_{max})}{L_{max}}\right)^{\frac{1}{\alpha}} * j_{max}, \text{ and} \quad (1\text{-}1)$$

$$T(j) = \frac{K(j)}{2^{X-X'}}, \quad (1\text{-}2)$$

where j=0, 1, 2, . . . , or N−1, $N=2^X$, T(j) is a first LUT value in the first LUT corresponding to a j-th gray scale, L(j) is a luminance value for the j-th gray scale obtained based on $L_{min}$ and $L_{max}$ in accordance with the DICOM GSDF standard, K(j) is a placeholder value for calculation of T(j), $L_{min}$ is a minimum luminance value of the display module, $L_{max}$ is a maximum luminance value of the display module, $j_{max}$ is a maximum gray scale value for the first LUT, X is a bit number callable for the processor, X' is a bit number of the display module, and α is a correction coefficient.

In some embodiments, the correction coefficient α is in a range of 2.225 to 2.245, inclusive.

In some embodiments, the correction coefficient α is in a range of 2.230 to 2.240, inclusive.

In some embodiments, a value of the correction coefficient α is 2.235.

In some embodiments, the bit number callable for the processor is greater than or equal to the bit number of the display module.

In some embodiments, the bit number callable for the processor is 10, and the bit number of the display module is 8 or 10.

In some embodiments, the display apparatus further includes a signal converter. The signal converter is located in the processor or the output device, or coupled to the processor and the output device. The signal converter is configured to: in a case where a bit number of the color-adjusted display image is inconsistent with a bit number of the display module, change the bit number of the color-adjusted display image to cause the bit number of the color-adjusted display image to be equal to the bit number of the display module.

In some embodiments, the display apparatus further includes a gray scale converter. The gray scale converter is located in the processor or the input device, or coupled to the input device and the processor. The gray scale converter is configured to: in a case where a bit number of an input display image is inconsistent with a bit number callable for the processor, change the bit number of the input display image to cause the bit number of the input display image to be equal to the bit number callable for the processor.

In some embodiments, the processor is further configured to adjust the initial gray scales of the display image by using a second LUT. The second LUT is different from the first LUT.

In some embodiments, the second LUT enables a color-adjusted display image to satisfy a GAMMA curve.

In some embodiments, the processor is further configured to: switch between the first LUT and the second LUT, and adjust the initial gray scales of the display image by using the first LUT or the second LUT.

In some embodiments, the processor is configured to: adjust initial gray scales of a display image in a first display region of the display module by using the first LUT, and adjust initial gray scales of a display image in a second display region of the display module by using the second LUT.

In some embodiments, the first display region is non-overlapping with the second display region, and the display image on the display module is completely divided by the first display region and the second display region.

In some embodiments, the display apparatus further includes a luminance sensing device. The luminance sensing device is coupled to the processor, and configured to detect an actual display luminance value on a display side of the display module. The processor is further configured to: determine whether the actual display luminance value on the display side of the display module is within a first threshold range; and adjust the actual display luminance value on the display side of the display module in a case where the actual display luminance value on the display side of the display module is not within the first threshold range.

In some embodiments, the processor is configured to adjust a duty cycle of a pulse width modulation (PWM) signal applied on a light-emitting element of the display module corresponding to each gray scale.

In some embodiments, the display apparatus further includes a luminance collection device coupled to the processor. The luminance collection device is configured to collect a luminance value of light in an environment where a display side of the display module is located. The processor is further configured to adjust an actual display luminance of the display module according to the luminance value of the light in the environment where the display side of the display module is located.

In some embodiments, the processor is configured to adjust a duty cycle of a pulse width modulation (PWM) signal applied on a light-emitting element of the display module corresponding to each gray scale.

In some embodiments, K(j) is a result by a rounding operation of an actual calculated value on a right side of an equal sign in formula (1-1), and the rounding operation is performed at a first decimal place, a second decimal place, or a third decimal place of the actual calculated value on the right side of the equal sign in formula (1-1).

In another aspect, a luminance adjustment method for a display apparatus is provided. The method includes: obtaining initial gray scales of a display image; adjusting the initial gray scales of the display image by using a first display data lookup table (LUT); and outputting a color-adjusted display image. The color-adjusted display image meets the Digital Imaging and Communications in Medicine (DICOM) Grayscale Standard Display Function (GSDF) standard, and a value of a contrast response of the color-adjusted display image is less than or equal to 11%.

In some embodiments, the first LUT includes at least one first LUT value, and the at least one first LUT value satisfies a following relationship:

$$K(j) = \left(L(j) - \frac{L_{min} * (1 - j/j_{max})}{L_{max}}\right)^{\frac{1}{\alpha}} * j_{max}, \text{ and} \tag{1-1}$$

$$T(j) = \frac{K(j)}{2^{X-X'}}, \tag{1-2}$$

where j=0, 1, 2, . . . , or N−1, N=$2^X$, T(j) is a first LUT value in the first LUT corresponding to a j-th gray scale, L(j) is a luminance value for the j-th gray scale obtained based on $L_{min}$ and $L_{max}$ in accordance with the DICOM GSDF standard, K(j) is a placeholder value for calculation of T(j), $L_{min}$ is a minimum luminance value of the display module, $L_{max}$ is a maximum luminance value of the display module, $j_{max}$ is a maximum gray scale value for the first LUT, X is a bit number callable for the processor, X' is a bit number of the display module, and α is a correction coefficient.

In some embodiments, the method further includes: switching between the first LUT and a second LUT; and adjusting the initial gray scales of the display image by using the first LUT or the second LUT. The second LUT enables an adjusted image to satisfy a GAMMA curve.

In some embodiments, K(j) is a result by a rounding operation of an actual calculated value on a right side of an equal sign in formula (1-1), and the rounding operation is performed at a first decimal place, a second decimal place, or a third decimal place of the actual calculated value on the right side of the equal sign in formula (1-1).

In yet another aspect, a non-transitory computer-readable storage medium is provided. The non-transitory computer-readable storage medium has stored computer program instructions. When executed on a computer (e.g., a display apparatus), the computer program instructions cause the computer to perform the luminance adjustment method for the display apparatus as described in any one of the above embodiments.

In yet another aspect, a computer program product is provided. The computer program product includes computer program instructions. When executed on a computer (e.g., a display apparatus), the computer program instructions cause the computer to perform the luminance adjustment method for the display apparatus as described in any one of the above embodiments.

In yet another aspect, a computer program is provided. When executed on a computer (e.g., a display apparatus), the computer program causes the computer to perform the luminance adjustment method for the display apparatus as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person having ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DESCRIPTION OF THE INVENTION

Figure 1:
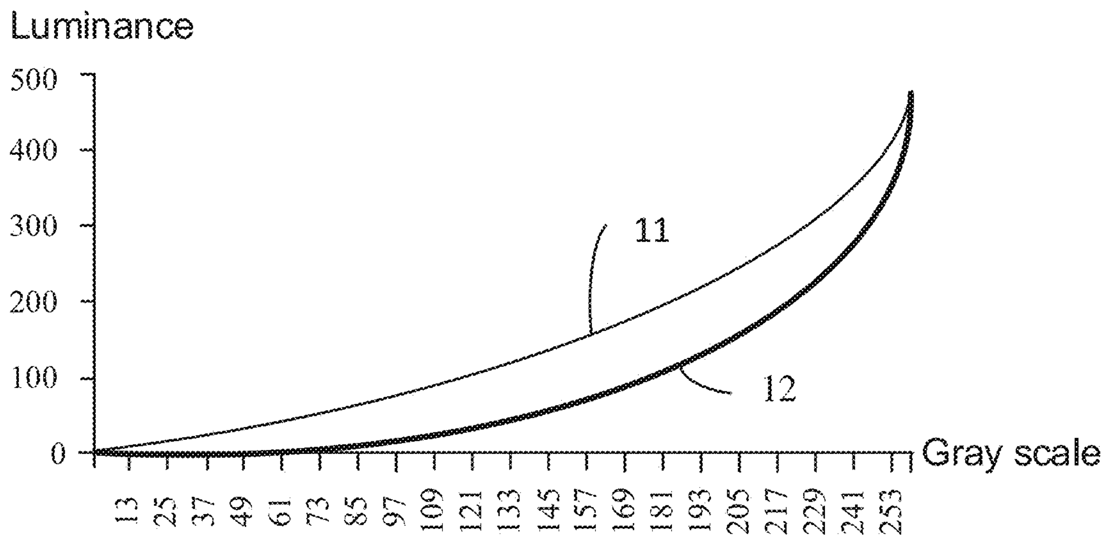
FIG. 1 is a schematic diagram showing a GAMMA curve and a Digital Imaging and Communications in Medicine (DICOM) curve, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting" depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" as used herein indicates an open and inclusive expression, which does not exclude devices that are applicable to or configured to perform additional tasks or steps.

Terms such as "about", "substantially" or "approximately" as used herein include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In the medical field, when doctors make diagnoses through medical images, and accuracy of the diagnoses depends on screen information of the medical images displayed by display modules (such as medical display screens). When a medical image is displayed by different display modules, the same medical image is displayed as inconsistent images by different display modules since parameters such as manufacturers and models of the different display modules may be different, which affects the accuracy of doctors' diagnoses. In order to ensure that the same medical image is displayed consistently by different display apparatus, the display modules may be calibrated in accordance with the Digital Imaging and Communications in Medicine (DICOM) standard.

Part 14 of the DICOM standard defines the Grayscale Standard Display Function (GSDF). The GSDF may ensure that a medical image is displayed as consistent gray scale images by a plurality of display apparatuses that comply with the DICOM standard. Therefore, for different display modules that comply with the DICOM standard, displayed images may be consistent, which improves the accuracy of diagnoses.

For example, images displayed by a display module meeting the DICOM standard includes that, each gray scale of the display module and a luminance corresponding to the gray scale satisfy a DICOM curve. As shown in FIG. 1, a curve 12 is a DICOM curve. When a relationship between each gray scale of the display module and the luminance corresponding to the gray scale satisfies the curve 12, images displayed by the display module meets the DICOM standard.

In order to make images displayed by display modules meet the DICOM standard, display apparatus generally needs to be calibrated according to a DICOM curve when leaving the factory. In related art, in a case where images displayed by a display apparatus does not satisfy the DICOM curve, a display data look-up table (LUT) of the display apparatus needs to be corrected. The LUT may be stored, for example, in a system board of the display apparatus. That is, in a case where a display luminance corresponding to a gray scale of a display module does not satisfy the DICOM curve, a LUT corresponding to the gray scale needs to be corrected so as to make the display luminance corresponding to the gray scale satisfies the DICOM curve. Due to differences between different display apparatuses, a LUT of each display apparatus needs to be corrected before the display apparatus leaves the factory. However, in the related art, when the LUT of each display apparatus is corrected, a corresponding displayed image inevitably undergoes a phenomenon such as "identical scales" (the luminances of two adjacent gray scales are the same) and "regressive scale" (the luminance of the previous gray scale is greater than that of the current one), which affects accuracy of the display image.

In view of this, embodiments of the present disclosure provide a display apparatus. The display apparatus may accurately display a luminance for each gray scale meeting the DICOM standard.

Figure 2:
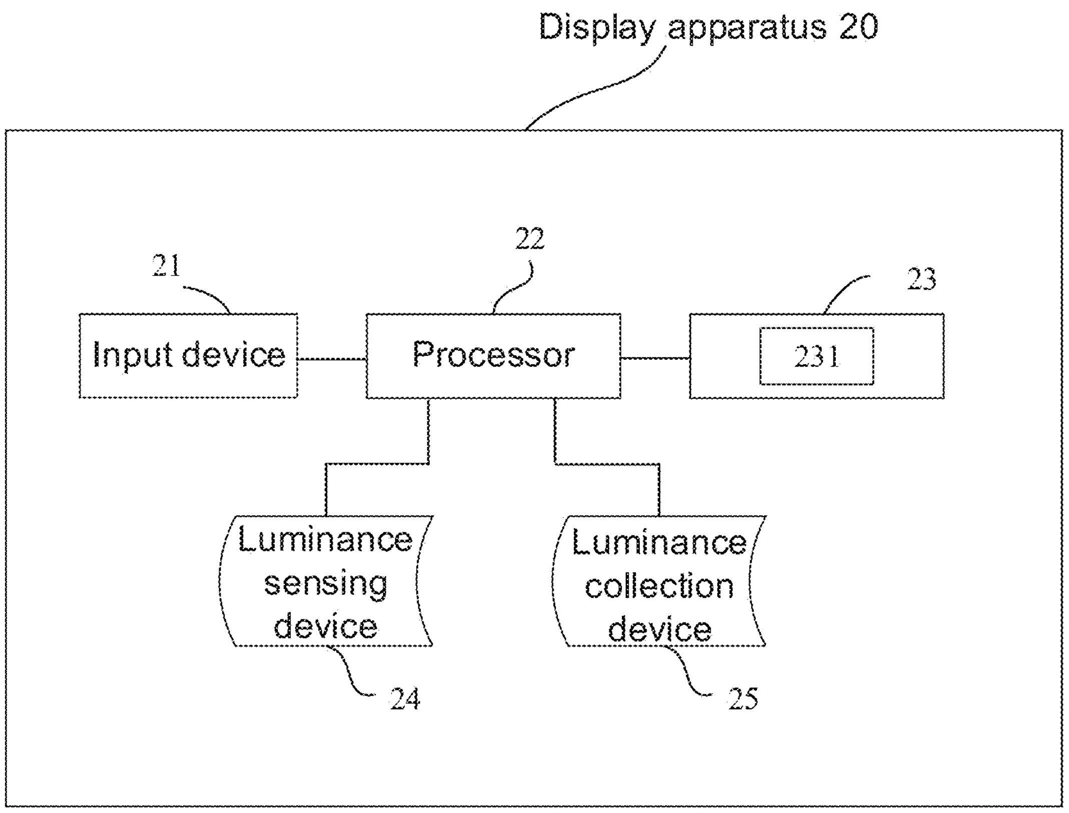
FIG. 2 is a schematic diagram of a display apparatus, in accordance with some embodiments.

FIG. 2 shows a display apparatus 20 provided by embodiments of the present disclosure. As shown in FIG. 2, the display apparatus 20 includes an input device 21, a processor 22 and an output device 23.

For example, the output device 23 includes a display module 231. The display module 231 may be any one of display modules such as an organic light-emitting diode (OLED) display module, a quantum-dot light-emitting diode (QLED) display module, a quantum-dot organic light-emitting diode (QD-OLED) display module, or a liquid crystal display (LCD) display module. Embodiments of the present disclosure do not limit a type of the display module 231.

The input device 21 is configured to obtain initial gray scales of a display image.

For example, the input device 21 may obtain initial gray scales of pixel points of the display image. The initial gray scales of the display image may be gray scale data of an image which is input to the display apparatus 20 and used for being displayed on the display module 231. The initial gray scales of the display image may be determined by a display bit number of the display image (which may be referred to as a bit number of the display image hereinafter). For example, in a case where the display image is displayed in 8 bits, a number of the initial gray scales is $2^8$, i.e., 256, and a range of the initial gray scales is from a 0-th gray scale to a 255-th gray scale, inclusive. For another example, in a case where the display image is displayed in 10 bits, the number of the initial gray scales is $2^{10}$, i.e., 1024, and the range of the initial gray scales is from a 0-th gray scale to a 1023rd gray scale, inclusive.

For example, the initial gray scales of the display image are initial gray scales of a display image input to the display apparatus 20 from an outside, and are used for expressing display information of the display image. For example, the display image may be an image of a lesion location, or an image including an image of a lesion location.

In some examples, the display image may be input to the input device 21 according to a control instruction issued by a computer. For example, the display image may be input from a master control board of the computer. The display image may be input to the input device 21 in a wired or wireless manner. In a case where the display image is input to the input device 21 in a wireless manner, the input device 21 may include a wireless transmission component such as a wireless fidelity (Wi-Fi) component or a Bluetooth component.

In some embodiments, a bit number callable for the processor 22 may be the same as or different from a bit number of an input display image. It will be noted that, the input display image may be the display image obtained by the input device 21, i.e., a display image composed of initial gray scale data of the display image obtained by the input device 21.

For example, the bit number callable for the processor 22 is greater than or equal to the bit number of the input display image. For example, the bit number callable for the processor 22 is 10, and the bit number of the input display image is 8. Alternatively, the bit number callable for the processor 22 is 10, and the bit number of the input display image is 10.

In order to ensure that the bit number of the input display image is the same as the bit number callable for the processor 22, in some embodiments, the display apparatus 20 further includes a gray scale converter. The gray scale converter is configured to: change the bit number of the input display image to cause the bit number of the input display image to be equal to the bit number callable for the processor 22 in a case where the bit number of the input display image is inconsistent with the bit number callable for the processor 22.

In some examples, the gray scale converter may be located in the processor 22. The gray scale converter being located in the processor 22 may be understood to mean that, the gray scale converter is a portion of the processor 22, or the processor 22 implement functions of the gray scale converter (e.g., the processor 22 and the gray scale converter are the same device). For example, in a case where the bit number of the input display image is 8, and the bit number callable for the processor 22 is 10, after obtaining the initial gray scales of the input display image from the input device 21, the processor 22 may adjust the bit number of the input display image from 8 to 10. In this way, it may be possible to ensure that a number of gray scales of the input display image is consistent with a number of gray scales of the processor 22.

In some other examples, the gray scale converter may be located in the input device 21. The gray scale converter being located in the input device 21 may be understood to mean that, the gray scale converter is a portion of the input device 21, or the input device 21 may implement the functions of the gray scale converter (e.g., the input device 21 and the gray scale converter are the same device). For example, in the case where the bit number of the input display image is 8, and the bit number callable for the processor 22 is 10, after obtaining the initial gray scales of the input display image, the input device 21 may adjust the bit number of the input display image, i.e., change the bit number of the display image from 8 to 10. In this way, it may be possible to ensure that the number of gray scales of the input display image is consistent with the number of gray scales of the processor 22.

In yet some other examples, the gray scale converter may be coupled to the input device 21 and the processor 22. The gray scale converter is using for receiving the input display image from the input device 21, adjusting the bit number of the input display image to be the same as the bit number callable for the processor 22, and then inputting the input display image to the processor 22, so that the number of the gray scales of the input display image is ensured to be consistent with the number of the gray scales of the processor 22.

After obtaining the input display image, the processor 22 needs to adjust the initial gray scales of the input display image. The processor 22 is configured to adjust initial gray scales of the display image by using a first LUT (i.e., a first display data look-up table).

It will be noted that, initial gray scales of a display image on which the adjustment is performed on may be the initial gray scales of the input display image, or initial gray scales of a display image obtained through conversion by the gray scale converter. The gray scale converter does not adjust gray scales. For example, a gray scale ratio between a red color, a green color and a blue color for each pixel of the input display image is the same as that of the display image obtained through conversion by the gray scale converter.

It will be understood that, in embodiments of the present disclosure, initial gray scales and adjusted gray scales are distinguished from each other according to whether adjustment is performed.

The processor 22 adjusting the initial gray scales of the display image by using the first LUT includes that, the processor 22 configures gray scale values of pixels for the display module 231 according to the first LUT.

In some embodiments, the first LUT includes at least one first LUT value. In some examples, the first LUT includes first LUT values corresponding to all gray scales.

First LUT values each correspond to gray scale values in a one-to-one manner. A first LUT value satisfies a following relationship:

$$K(j)=\left(L(j)-\frac{L_{min}*(1-j/j_{max})}{L_{max}}\right)^{\frac{1}{\alpha}}*j_{max},\ \text{and} \tag{1-1}$$

$$T(j)=\frac{K(j)}{2^{X-X'}}, \tag{1-2}$$

In formulas (1-1) and (1-2), T(j) is a first LUT value in the first LUT corresponding to a j-th gray scale, and K(j) is a placeholder value for calculation of T(j) by using formula (1-2). After the processor 22 adjusts the j-th gray scale of the display image according to T(j), it may be possible to ensure that a display image output by the display module 231 meets the Digital Imaging and Communications in Medicine (DICOM) Grayscale Standard Display Function (GSDF) standard. That is, it may be possible to ensure that each gray scale of a color-adjusted display image and a luminance corresponding thereto satisfy a DICOM curve, e.g., the curve 12 in FIG. 1.

In formulas (1-1) and (1-2), X is the bit number of callable for the processor 22, and X' is a bit number of the display module 231. A value range of j for gray scales corresponding to the first LUT is determined by the bit number X of callable for the processor 22, and j is a gray scale value for the first LUT. In a case where j takes any value from the set of {0, . . . , N−1} (j=0, 1, 2, . . . , or N−1), a minimum value of j is 0, and a maximum value of j is N−1, where $N=2^X$. For example, in a case where the bit number of callable for the processor 22 is 10, the maximum value of j is $2^X-1$, i.e., 1023.

$j_{max}$ is a maximum gray scale value for the first LUT. In a case where the bit number X of callable for the processor 22 is 10, the maximum gray scale value $j_{max}$ for the first LUT is 1023.

$L_{min}$ is a minimum luminance value of the display module 231, and $L_{max}$ is a maximum luminance value of the display module 231. $L_{min}$ and $L_{max}$ may be a minimum luminance value and a maximum luminance value of the display module 231 measured by a measuring instrument such as a color analyzer. For example, for a 8-bit display module 231, $L_{min}$ may be obtained by performing detection on a sub-pixel performing display with a gray scale of 0 or an image with a gray scale of 0 displayed thereon by a measuring instrument, and $L_{max}$ may be obtained by performing detection on a sub-pixel performing display with a gray scale of 255 or an image with a gray scale of 255 displayed thereon by the measuring instrument. It will be noted that, $L_{max}$ should be understood as a luminance value when the display module 231 actually displays at a highest gray scale. It will be understood that, a highest luminance value the display module 231 is capable of presenting may be greater than $L_{max}$.

For example, a pixel of the display module 231 includes three sub-pixels, i.e., a red sub-pixel, a green sub-pixel and a blue sub-pixel. By detecting luminance values of a red sub-pixel, a green sub-pixel and a blue sub-pixel at a gray scale of 0, $L_{min}$ for a red color, $L_{min}$ for a green color and $L_{min}$ for a blue color are respectively obtained; and by detecting luminance values of a red sub-pixel, a green sub-pixel and a blue sub-pixel at a gray scale of 255, $L_{max}$ for a red color, $L_{max}$ for a green color and $L_{max}$ for a blue color are respectively obtained.

L(j) is a luminance value for the j-th gray scale obtained based on $L_{min}$ and $L_{max}$ in accordance with the DICOM GSDF standard. The luminance value L(j) for the j-th gray scale meeting requirements of the DICOM GSDF standard may be referred to as a theoretical luminance value.

For example, for a red color, a green color and a blue color, L(j) for the red color, L(j) for the green color and L(j) for the blue color may be obtained through $L_{min}$ and $L_{max}$ thereof (i.e., $L_{min}$ for the red color and $L_{max}$ for the red color, $L_{min}$ for the green color and $L_{max}$ for the green color, and $L_{min}$ for the blue color and $L_{max}$ for the blue color) respectively. Then, first LUT values T(j) for the red color, the green color and the blue color are respectively calculated according to L(j) for the red color, L(j) for the green color and L(j) for the blue color. It will be understood that, the first LUT may include first LUT values for the red color, the green color and the blue color.

In formulas (1-1) and (1-2), α is a correction coefficient. In some embodiments, a value of a may be in a range of 2.225 to 2.245, inclusive. For example, the value of a may be in a range of 2.230 to 2.240 inclusive. For example, a may be 2.235.

For example, in a case where the correction coefficient α is in the range of 2.225 to 2.245, inclusive, a value of a contrast response of a color-adjusted display image by using the first LUT may be less than or equal to 11%.

For example, in a case where the correction coefficient α is in the range of 2.230 to 2.240, inclusive, the value of the contrast response of the color-adjusted display image by using the first LUT may be less than or equal to 9%.

For yet another example, in a case where a value of the correction coefficient α is 2.235, the value of the contrast response of the color-adjusted display image by using the first LUT may be less than 5%. Therefore, for the display apparatus 20 provided by the embodiments of the present disclosure, the value of the contrast response of the color-adjusted display image is less than or equal to 11% by using the first LUT to adjust the initial gray scales of the input display image.

It will be noted that, in a case of calculating T(j) by using formulas (1-1) and (1-2), the obtained K(j) may be understood as a result by a "rounding" operation of an actual calculated value on a right side of an equal sign in formula (1-1). The "rounding" operation may be performed at any decimal place of the actual calculated value on the right side of the equal sign in formula (1-1). For example, the "rounding" operation may be performed at a first decimal place, a second decimal place, or a third decimal place.

For example, the "rounding" operation may be performed at the first decimal place of the actual calculated value on the right side of the equal sign in formula (1-1), which can be understood as performing the "rounding" operation on a first number after the decimal point. For example, in a case where the actual calculated value on the right side of the equal sign in formula (1-1) is 3.25, a value of K(j) may be 3.

For another example, the "rounding" operation may be performed at the second decimal place of the actual calculated value on the right side of the equal sign in formula (1-1), which can be understood as performing the "rounding" operation on a second number after the decimal point. For example, in the case where the actual calculated value on the right side of the equal sign in formula (1-1) is 3.25, the value of K(j) may be 3.3.

For example, the "rounding" operation is performed at the first decimal place of the actual calculated value on the right side of the equal sign in formula (1-1). In this way, actual display effects are ideal, which may be used for generating T(j).

As can be seen from formulas (1-1) and (1-2), in order to obtain a first LUT value in the first LUT corresponding to the j-th gray scale, L(j) needs to be obtained first. For example, under the DICOM GSDF standard, a theoretical luminance value L(j) for each gray scale can be determined according to a minimum luminance value $L_{min}$ and a maximum luminance value $L_{max}$.

A calculation process of theoretical luminance value L(j) in formulas (1-1) and (1-2) is explained below. According to the GSDF standard in the DICOM standard, the calculation process may include formulas (2), (3) and (4) as listed below.

Part 14 of the DICOM standard document defines the GSDF. A GSDF curve corresponding to the GSDF takes the Just Noticeable Difference (JND) as the abscissa and luminance as the ordinate. The JND may represent a gray scale that human eyes are just capable of distinguishing. For example, a JND value may represent a gray level, and each gray level (i.e., each JND value) corresponds to a luminance.

After obtaining the minimum luminance value $L_{min}$ and the maximum luminance value $L_{max}$ of the display module 231, a first gray level (i.e., a first JND value) corresponding to the minimum luminance value and a second gray level (i.e., a second JND value) corresponding to the maximum luminance value can be obtained according to formula (2). The first JND value may determine a first endpoint of a gray level interval, and the second JND value may determine a second endpoint of the gray level interval. Therefore, a range of the gray level interval can be determined through the minimum luminance value $L_{min}$ and the maximum luminance value $L_{max}$.

A JND value of a gray scale corresponding to the minimum luminance value $L_{min}$ and a JND value of a gray scale corresponding to the maximum luminance value $L_{max}$ are calculated first through formula (2) as follows:

$$JND(j) = A + B*\log_{10}L_j + C*(\log_{10}L_j)^2 + D*(\log_{10}L_j)^3 + E*(\log_{10}L_j)^4 + F*(\log_{10}L_j)^5 + G*(\log_{10}L_j)^6 + H*(\log_{10}L_j)^7 + I*(\log_{10}L_j)^8, \tag{2}$$

where $L_{min}$ and $L_{max}$ each serve as $L_j$, A=71.498068, B=94.593053, C=41.912053, D=9.8247004, E=0.28175407, F=−1.1878455, G=−0.18014349, H=0.14710899, and I=−0.017046845.

For example, in a case where the minimum luminance value $L_{min}$ of the display module 231 is 0.5 nits, and the maximum luminance value $L_{max}$ is 800 nits, the first JND value corresponding to the minimum luminance value $L_{min}$ and the second JND value corresponding to the maximum luminance value $L_{max}$ are obtained according to formula (2). The gray level interval is obtained according to the first JND value and the second JND value.

In the case where the bit number callable for the processor is 10, the gray level interval may be divided into 1024 gray levels, i.e., JND (0) to JND (1023). Thus, in formula (2), a value of j is 0 or 1023 (j=0, or j=1023). In a case where j=0, the first JND value is JND(0); and in a case where j=1023, the second JND value is JND(1023).

Based on JND(0) and JND(1023) obtained through formula (2), remaining JND values, i.e., JND(1) to JND(1022), can be obtained according to formula (3).

$$JND(j) = JND(0) + \frac{j}{N-1}*(JND(N-1) - JND(0)), \tag{3}$$

where j=0, 1, 2, . . . , or 1023, and N=1024.

Then, based on the JND values obtained by formulas (2) and (3), a theoretical luminance values L(j) corresponding to each gray scale can be obtained according to formula (4) below.

$$\log_{10}L(j) = \frac{a + c*JND(j) + e*(JND(j))^2 + g*(JND(j))^3 + m*(JND(j))^4}{1 + b*JND(j) + d*(JND(j))^2 + f*(JND(j))^3 + h*(JND(j))^4 + k*(JND(j))^5}. \tag{4}$$

In formula (4), L(j) is a theoretical luminance value for the j-th gray scale, JND(j) is the JND value for the j-th gray scale, j=0, 1, 2, . . . , or 1023, a=−1.301877, b=−2.5840191E-2, c=8.0242636E-2, d=−1.0320229E-1, e=1.3646699E-1, f=2.8745620E-2, g=−2.5486404E-2, h=−3.1978977E-3, k=1.2992634E-4, and m=1.3635334E-3.

For example, by substituting the values of JND (0) to JND (1023) obtained by formulas (2) and (3) into formula (4), theoretical luminance values corresponding to a 0-th gray scale to a 1023rd gray scale can be calculated, respectively.

For example, in a case where the minimum luminance value $L_{min}$=0.5 nits, the maximum luminance value $L_{max}$=800 nits, and the determined gray level interval is divided into 1024 gray levels, each JND value JND (j) and the theoretical luminance value L (j) corresponding to each gray scale as shown in Table 1 can be calculated according to formulas (2), (3) and (4), where j=0, 1, . . . , or 1023.

TABLE 1

| Gray scale value j | JND(j) | Theoretical luminance value L(j) (nit) |
|---|---|---|
| 0 | 46.55782581 | 0.500476027 |
| 1 | 47.27146297 | 0.511975657 |
| 2 | 47.98510012 | 0.523630443 |
| 3 | 48.69873728 | 0.535441236 |
| 4 | 49.41237443 | 0.547408888 |
| 5 | 50.12601159 | 0.559534253 |
| 6 | 50.83964874 | 0.571818186 |
| 7 | 51.5532859 | 0.584261546 |
| 8 | 52.26692305 | 0.596865192 |
| 9 | 52.98056021 | 0.609629984 |
| 10 | 53.69419736 | 0.622556786 |
| . . . | . . . | . . . |
| 1023 | 776.6086356 | 800 |

For another example, in a case where the minimum luminance value $L_{min}$=0.42 nits, the maximum luminance value $L_{max}$=400 nits, and the determined gray level interval is divided into 256 gray levels, each JND value JND (j) and the theoretical luminance value L (j) corresponding to each gray scale as shown in Table 2 can be calculated according to formulas (2), (3) and (4), where j=0, 1, . . . , or 255.

TABLE 2

| Gray scale value j | JND(j) | Theoretical luminance value L(j) (nit) |
|---|---|---|
| 0 | 41.29773359 | 0.420419238 |
| 1 | 43.77419829 | 0.457087331 |
| 2 | 46.25066299 | 0.495573922 |
| 3 | 48.72712769 | 0.5391434 |
| 4 | 51.20359238 | 0.578144128 |
| 5 | 53.68005708 | 0.62229907 |
| 6 | 56.15652178 | 0.668415216 |
| 7 | 58.63298648 | 0.71652891 |
| 8 | 61.10945118 | 0.76667681 |

TABLE 2-continued

| Gray scale value j | JND(j) | Theoretical luminance value L(j) (nit) |
|---|---|---|
| 9 | 63.58591587 | 0.818895917 |
| 10 | 66.06238057 | 0.873223592 |
| . . . | . . . | . . . |
| 255 | 672.7962316 | 400 |

Figure 3A:
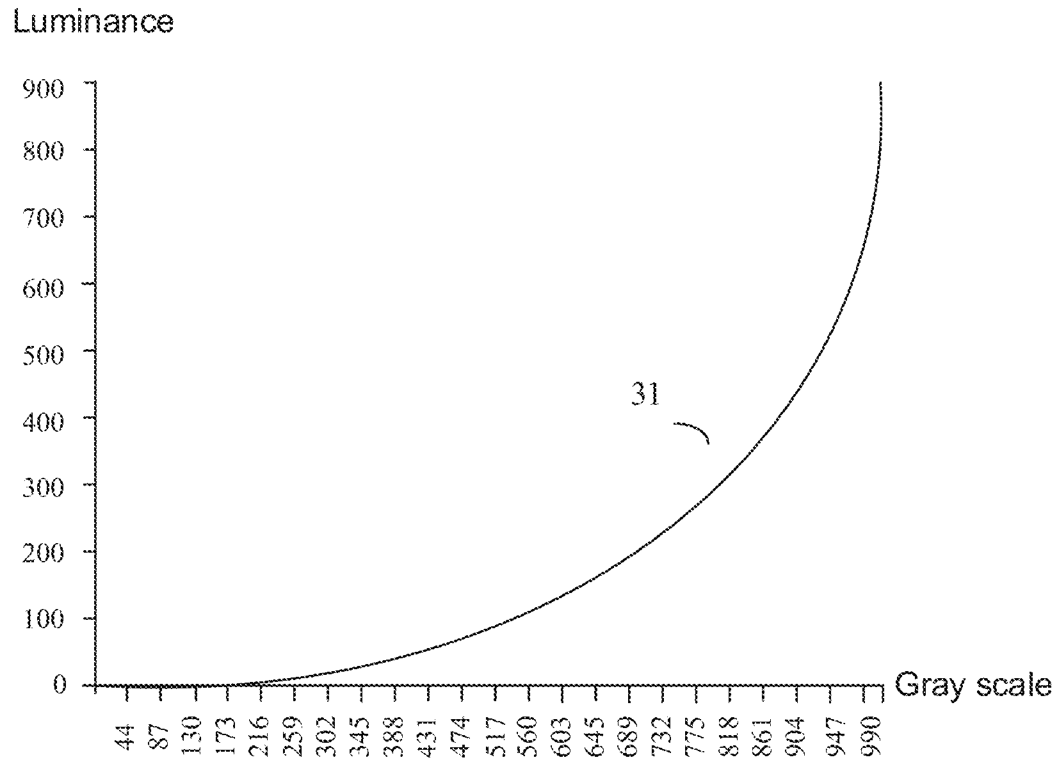
FIGS. 3(*a*) and 3(*b*) is a schematic diagram showing some other DICOM curves, in accordance with some embodiments.
Figure 3B:
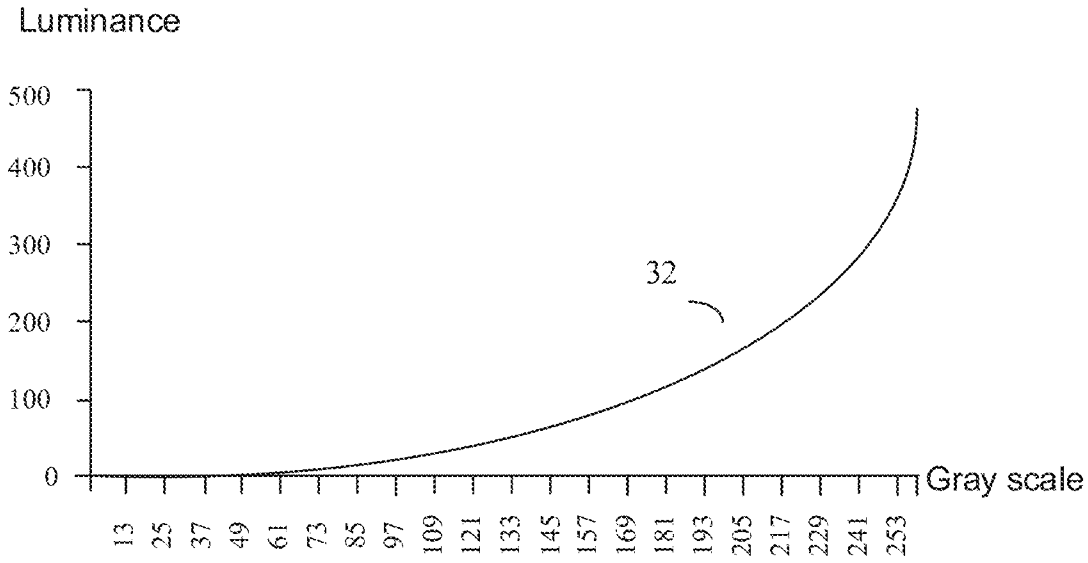

As shown in FIGS. 3(*a*) and (*b*), a curve 31 in part (a) of FIG. 3 can be obtained according to the relationship between each gray scale and a theoretical luminance value corresponding thereto in Table 1. A luminance value corresponding to each gray scale in the curve 31 meets the DICOM GSDF standard. A curve 32 in part (b) of FIG. 3 can be obtained according to the relationship between each gray scale and a theoretical luminance value corresponding thereto in Table 2. A luminance value corresponding to each gray scale in the curve 32 meets the DICOM GSDF standard.

Therefore, according to the formulas (2), (3) and (4) above, it may be possible to calculate the theoretical luminance value L(j) corresponding to each gray scale meeting the DICOM GSDF standard. Here, j=0, 1, 2 . . . , or 1023. j is determined according to the bit number callable for the processor 22. After obtaining the theoretical luminance value L(j) for each gray scale, each first LUT value in the first LUT can be calculated according to formulas (1-1) and (1-2). For example, the obtained theoretical luminance values L(j) may be substituted into the formulas (1-1) and (1-2) above, and then a first LUT value, i.e., each of T(0) to T(1023), in the first LUT corresponding to each gray scale can be calculated.

In some examples, the processor 22 can obtain the first LUT value T(j) corresponding to each gray scale according to formulas (1-1) and (1-2), and the first LUT value can be recognized by the processor 22. That is, the processor 22 is capable of adjusting the initial gray scales of the input display image according to T(j) in the first LUT, so that the color-adjusted display image meets the DICOM GSDF standard. For example, the processor 22 adjusting an initial gray scale of the input display image by using a first LUT value may include that, the processor 22 configuring a luminance ratio between the red color, the green color and the red color of a same gray scale for the initial gray scale of the input display image according to the first LUT value so as to achieve a purpose of color adjustment. In this way, a color temperature of the display image is simultaneously configured.

In some examples, the display apparatus 20 may store the first LUT. The processor 22 may use the first LUT stored in the display apparatus 20 to adjust the initial gray scales of the input display image.

For example, in a case where a numeration system of the first LUT value corresponding to each gray scale in the first LUT calculated according to formulas (1-1) and (1-2) is different from a numeration system recognizable for the processor 22, the processor 22 may further convert the numeration system of the first LUT value calculated according to formulas (1-1) and (1-2), so that a first LUT value after conversion can be recognized by the processor 22. The numeration system of the first LUT value calculated according to formulas (1-1) and (1-2) is not limited in embodiments of the present disclosure. For example, in a case where the first LUT value calculated according to formulas (1-1) and (1-2) is decimal data, and data recognizable for the processor 22 is hexadecimal data, a numeration-system conversion tool may be used to convert the first LUT value in decimal into a first LUT value in hexadecimal recognizable for the processor 22 to obtain a first LUT in hexadecimal.

The output device 23 is configured to: output the color-adjusted display image. The color-adjusted display image meets the DICOM GSDF standard, and the value of the contrast response of the color-adjusted display image is less than or equal to 11%.

In some examples, the bit number of the first LUT is consistent with the bit number callable for the processor 22. For example, the two may both be 10.

In some embodiments, the bit number of the display module 231 may be inconsistent with the bit number of the first LUT. In a case where the bit number of the first LUT is inconsistent with the bit number of the display module 231, a bit number of the color-adjusted display image needs to be adjusted before the color-adjusted display image is output through the display module 231. For example, in a case where the bit number of the color-adjusted display image is 10, and the bit number of the display module 231 is 8, before the color-adjusted display image is output through the display module 231, the bit number of the color-adjusted display image needs to be adjusted to 8.

In light of this, in some embodiments, the display apparatus 20 further includes a signal converter. The signal converter is configured to: change the bit number of the color-adjusted display image to cause the bit number of the color-adjusted display image to be equal to the bit number of the display module 231 in a case where the bit number of the color-adjusted display image is inconsistent with the bit number of the display module 231.

It will be noted that, the gray scales of the color-adjusted display image may be gray scales of a display image adjusted by using the first LUT, or gray scales of a display image obtained after conversion of the display image adjusted by using the first LUT by the signal converter.

For example, the signal converter can convert 1024 gray scales into 256 gray scales for display. For example, the signal converter may perform gray scale conversion by integrating gray scales, e.g., merging four gray scales into one gray scale, and thus conversion from 1024 gray scales into 256 gray scales is achieved. The gray scale conversion performed on the color-adjusted display image by the signal converter does not change a ratio between the red color, the green color and the blue color corresponding to each pixel. Therefore, the signal converter neither has a color adjustment function nor changes a color temperature of the color-adjusted display image. For example, the gray scale conversion performed on the color-adjusted display image by the signal converter does not change gain proportions corresponding to the red color, the green color and the blue color corresponding to each pixel.

In some examples, the signal converter may be located in the processor 22. The signal converter being located in the processor 22 may be understood to mean that, the signal converter is a portion of the processor 22, or the processor 22 implements functions of the signal converter (e.g., the processor 22 and the signal converter are the same device). For example, in a case where the bit number of the color-adjusted display image is 10, and the bit number of the display module 231 is 8, the processor 22 adjusts the bit number of the color-adjusted display image from 10 to 8. In this case, it may be possible to ensure that the number of gray scales of the color-adjusted display image is consistent with a number of gray scales of the display module 231.

In some other examples, the signal converter may be located in the output device 23. The signal converter being located in the output device 23 may be understood to mean that, the signal converter is a portion of the output device 23, or the output device 23 implements the functions of the signal converter (e.g., the output device 23 and the signal converter are the same device). For example, the output device 23 includes the display module 231 and a driver integrated circuit (IC) providing driving signals for the display module 231. The signal converter may be located in the driver IC. For example, in the case where the bit number of the color-adjusted display image is 10, and the bit number of the display module 231 is 8, after obtaining the color-adjusted display image, the output device 23 adjusts the bit number of the color-adjusted display image from 10 to 8. In this way, it may be possible to ensure that the number of gray scales of the color-adjusted display image is consistent with the number of gray scales of the display module 231.

In yet some other examples, the signal converter may be coupled to both the processor 22 and the output device 23. The signal converter is used for receiving the color-adjusted display image sent by the processor 22, converting the bit number of the color-adjusted display image to be equal to the bit number of the display module 231, and sending the color-adjusted display image to the output device 23, so that it is ensured that the number of gray scales of the color-adjusted display image is consistent with a number of gray scales of the output device 23.

Figure 4:
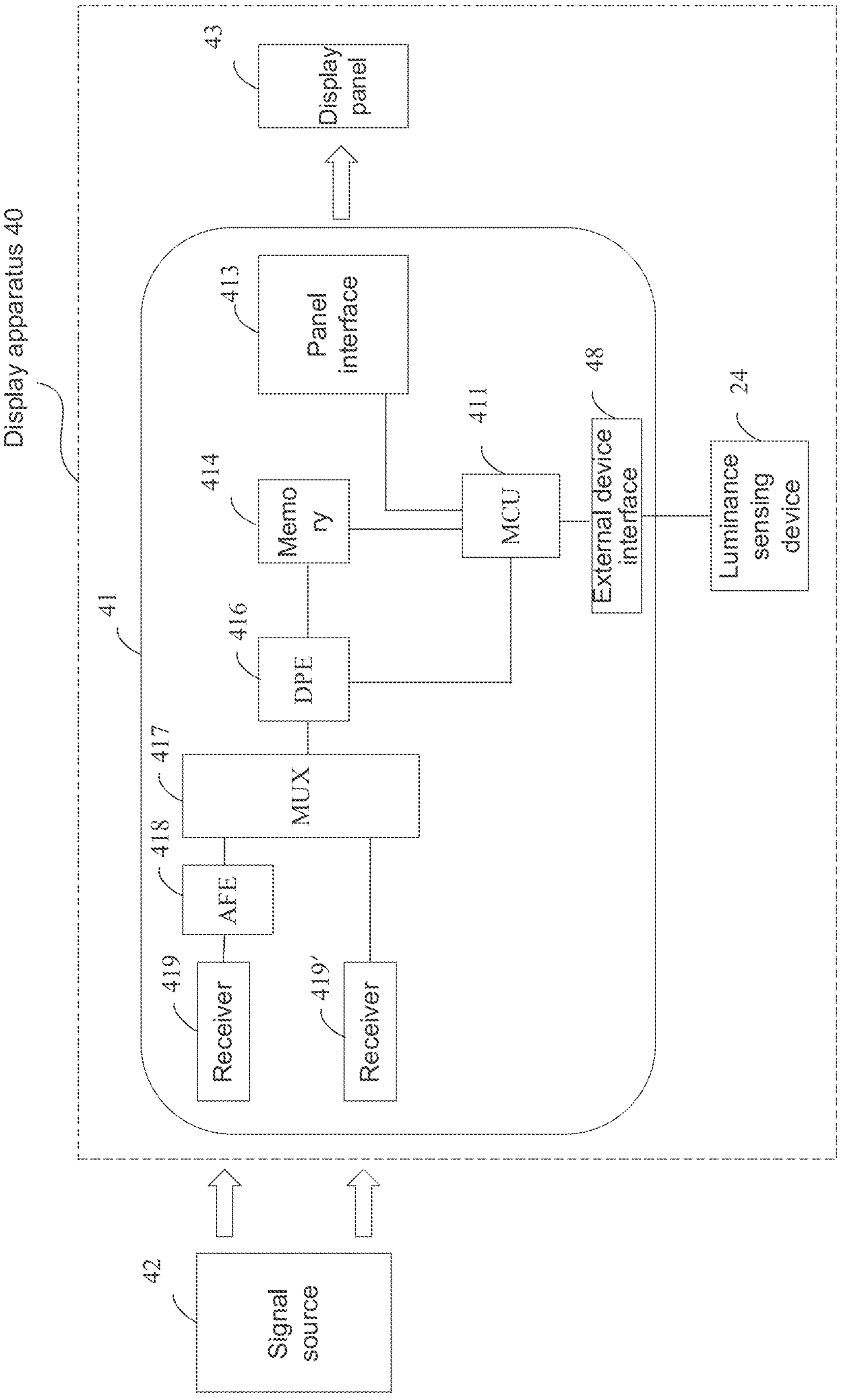
FIG. 4 is a schematic diagram of another display apparatus, in accordance with some embodiments.

FIG. 4 shows another display apparatus 40 provided by embodiments of the present disclosure. As shown in FIG. 4, the display apparatus 40 includes a system board 41 and a display panel 43.

As shown in FIG. 4, the system board 41 of the display apparatus 40 includes a micro controller unit (MCU) 411. The MCU 411 may be used to adjust the initial gray scales of the input display image. The MCU 411 is coupled to a memory 414. The memory 414 stores the first LUT therein. The MCU 411 calls the first LUT from the memory 414, and adjusts the initial gray scales of the input display image by using the first LUT. The system board 41 may further include a panel interface 413, a display processing engine (DPE) 416, a data selector (multiplexer, MUX for short) 417, an analog front end (AFE) 418 and a receiver (which may include at least one of a receiver 419 or a receiver 419'). The input device 21 may include the receiver 419 and/or the receiver 419'. The input device 21 may further include the AFE 418. The processor 22 may include the MCU 411, the DPE 416 and the MUX 417. The output device may include the panel interface 413 and the display panel 43. Functions of the gray scale converter and the signal converter may be implemented by MCU 411.

The display panel 43 is located in the display module 231, and displays the color-adjusted display image. The display module 231 may be a display module of any one of an organic light-emitting diode (OLED) display panel, a quantum-dot light-emitting diode (QLED) display panel, a quantum-dot organic light-emitting diode (QD-OLED) panel, or a liquid crystal display (LCD) panel. Embodiments of the present disclosure do not limit a type of the display panel 43. The display module 231 may further include assembly components, such as a housing. In a case where the display panel 43 is a liquid crystal display panel, the display module 231 may further include a backlight source. A display image may be generated by modulating light, emitted by the backlight source and transmitting through the liquid crystal panel, by the liquid crystal panel.

As shown in FIG. 4, in a case where a signal source 42 sends a display signal of a display image to the system board 41, at least one of the receiver 419 and the receiver 419' receives the signal sent by the signal source 42. For example, in a case where the display signal sent by the signal source 42 is an analog signal, the receiver 419 receives the display signal and sends the display signal to the AFE 418. The AFE 418 processes the display signal, for example, by performing analog-to-digital conversion of the analog display signal, to generate a digital display signal. In a case where the display signal is a digital signal, the receiver 419' receives the display signal. The receiver 419' and the AFE 418 send the display signal to the MUX 417. After the display signal is processed by the MUX 417 and the DPE 416, the DPE 416 sends a processing result to the MCU 411. According to a display requirement of, for example, adjusting the display image, the MCU 411 calls the first LUT stored in the memory 414, and adjusts the initial gray scales of the display image. The MCU 411 controls the display panel 43 to output the color-adjusted display image through the panel interface 413.

In summary, in the embodiments of the present disclosure, the processor 22 adjusts the display image of the display module 231 according to the first LUT, which therefore makes the display image of the display module 231 meet the DICOM GSDF standard. In the embodiments of the present disclosure, the input display image may be adjusted accurately by using the first LUT, which avoids possible abnormal phenomena such as "identical scales" and "regressive scale" in the display image due to errors during adjustment, and solves a problem of nonuniform luminance transition in the image.

Figure 5A:
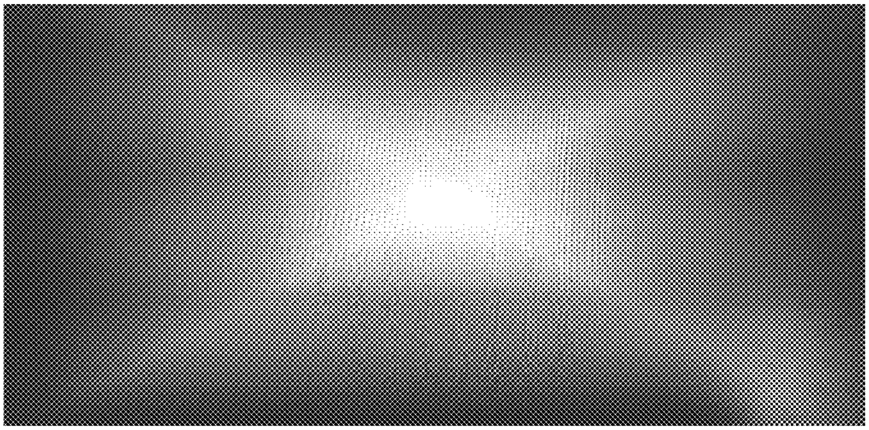
FIGS. 5(*a*) and 5(*b*) is a schematic diagram showing display images of a display module, in accordance with some embodiments.
Figure 5B:
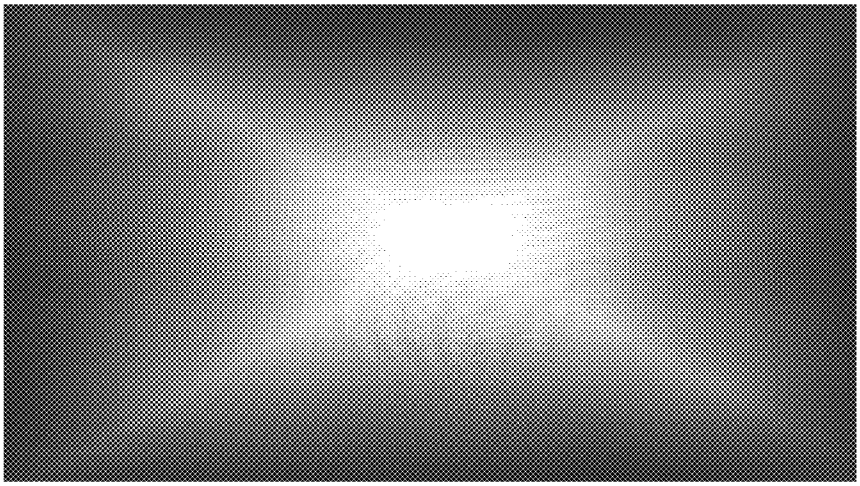

FIGS. 5(*a*) and (*b*) show schematic diagrams of two display images of the display module 231 in accordance with embodiments of the present disclosure. As shown in FIG. 5, part (a) in FIG. 5 shows an image displayed by the display module 231 after adjustment is performed by using a LUT in the related art, and part (b) in FIG. 5 shows an image displayed by the display module 231 after adjustment is performed by using the first LUT. As shown in FIG. 5, a luminance transition in the image displayed by the display module 231 shown in part (a) in FIG. 5 is not very even, and a phenomenon of "skipping scales" is obvious. In contrast, a luminance transition in the image displayed by the display module 231 shown in part (b) in FIG. 5 is even. Display effects of the image shown in part (b) in FIG. 5 are better than that of the image shown in part (a) in FIG. 5.

In some embodiments, the processor 22 is further configured to adjust the initial gray scales of the input display image by using a second LUT. The second LUT is different from the first LUT.

It will be noted that, different second LUTs may correspond to different tone curves. Embodiments of the present disclosure do not limit the second LUT. For example, the second LUT may correspond to a GAMMA curve and make an adjusted image satisfy a GAMMA curve. As shown in FIG. 1, a curve 11 is a GAMMA curve. In a case where a relationship between each gray scale of the display module 231 and a luminance value corresponding to the gray scale satisfies the curve 11, an image displayed by the display module 231 meets the GAMMA standard.

The processor 22 make a selection from different LUTs to adjust the initial gray scales of the input display image according to a display requirement. In a case where the processor 22 adjusts the initial gray scales of the input display image by using the second LUT, the color-adjusted display image output by the display module 231 satisfies the GAMMA curve.

For example, with reference to FIG. 4, the memory 414 may further store the second LUT. That is to say, the memory 414 may store both the first LUT and the second LUT, or may further store LUTs corresponding to other tone curves. According to a display requirement, the MCU 411 calls the first LUT or the second LUT in the memory 414 to adjust a color of the input display image, and adjusts the initial gray scales of the display image by using the first LUT or the second LUT, and then control the display panel 43 to output the color-adjusted display image through the panel interface 413.

In some embodiments, the first LUT may be an independent LUT or a first LUT obtained from the second LUT according to a mapping relationship; or may be an independent LUT or a second LUT obtained from the first LUT according to a mapping relationship.

For example, in a case where the display apparatus 20 stores therein the first LUT and a first mapping relationship between the first LUT and the second LUT, the processor 22 directly calls the first LUT to perform adjustment on the initial gray scales of the input display image in a case where the first LUT is needed to perform adjustment on the initial gray scales of the input display image; and the processor 22 calls both the first LUT and the first mapping relationship to calculate the second LUT and then performs adjustment on the initial gray scales of the input display image by using the second LUT in a case where the second LUT is needed to perform adjustment on the initial gray scales of the input display image.

For another example, in a case where the display apparatus 20 stores therein the second LUT and a second mapping relationship between the second LUT and the first LUT, the processor 22 directly calls the second LUT to perform adjustment on the initial gray scales of the input display image in the case where the second LUT is needed to perform adjustment on the initial gray scales of the input display image; and the processor 22 calls the second LUT and the second mapping relationship to calculate the first LUT and then performs adjustment on the gray scales of the input display image by using the first LUT in the case where the first LUT is needed to perform adjustment on the initial gray scales of the input display image.

Generally, GAMMA Correction is performed on display apparatus 20 before the display apparatus 20 leaves the factory, so that the luminance output by the display module 231 for each gray scale meets a GAMMA curve. In a case where the luminance for each gray scale of the display module 231 meets the GAMMA curve, an image displayed on the display module 231 conforms to viewing habits of human eyes during daily office work.

For medical display modules, doctors not only need to do daily work, but also need to read medical images. For these two working modes, tone curves that images displayed by the display module 231 need to meet are different. For example, in a daily office mode, display images of the display module 231 need to satisfy a GAMMA curve, so that the display images of the display module 231 are suitable for human eyes. In an image reading mode, display images of the display module 231 need to meet the DICOM GSDF standard, so that medical images are restored and lesion areas are distinguished.

In light of this, the display apparatus 20 provided by embodiments of the present disclosure can call the first LUT or the second LUT corresponding to different standards according to different working modes, which realizes switching of working modes of the display module 231 and solves a compatibility problem between doctors' daily office work and image reading diagnosis.

In some embodiments, the processor 22 is configured to: switch between the first LUT and the second LUT, and adjust the initial gray scales of the input display image by using the first LUT or the second LUT.

It will be noted that, switching between the first LUT and the second LUT may be understood as that, in a case where a working mode needs to be changed, the processor 22 changes from using the first LUT to using the second LUT and then adjusts the gray scales of the input display image by using the second LUT, or the processor 22 changes from using the second LUT to using the first LUT and then adjusts the gray scales of the input display image by using the first LUT. For example, both the first LUT and the second LUT are stored in the display apparatus 20, the processor 22 may call any one of the first LUT and the second LUT to adjust the initial gray scales of the input display image.

For example, the processor 22 may switch between the first LUT and the second LUT according to a received switching instruction. For example, in a case of receiving a first switching instruction, the processor 22 may switch from the second LUT to the first LUT, and adjust the initial gray scales of the input display image by using the first LUT, so that the adjusted image satisfies the DICOM GSDF standard, i.e., meets image requirements in the image reading mode. In a case of receiving a second switching instruction, the processor 22 switches from the first LUT to the second LUT, and adjusts the initial gray scales of the input display image by using the second LUT, so that the adjusted image satisfies the GAMMA curve, i.e., meets image requirements in the daily office mode.

In some examples, the first switching instruction or the second switching instruction may be sent to processor 22 by performing a state switching. For example, a toggle switch may be provided on the display apparatus 20, and the first switching instruction and the second switching instruction may be respectively sent by turning on or turning off the toggle switch for switching state. Embodiments of the present disclosure do not limit an implementation manner of the first switching instruction and the second switching instruction. For example, the toggle switch may be a physical key switch or a virtual key switch. Embodiments of the present disclosure are illustrated exemplarily by taking an example where the toggle switch acts as the implementation manner of the first switching instruction and the second switching instruction.

In a case where switching is from the daily office mode to the image reading mode, the toggle switch is turned on, a first switching instruction is sent to the processor 22, and the processor receives the first switching instruction and performs switching from the second LUT to the first LUT in response to the first switching instruction. In a case where switching is from the image reading mode to the daily office mode, the toggle switch is turned off, a second switching instruction is sent to the processor 22, and the processor 22 receives the second switching instruction and performs switching from the first LUT to the second LUT in response to the second switching instruction.

For example, the display module 231 currently works in the daily office mode. The processor 22 recognizes a switching instruction sent by the toggle switch and determines whether the toggle switch is in an on state or an off state. In a case where the toggle switch is in an off state, according to the second LUT, the processor 22 continues controlling the output device 23 to output the display image adjusted by using the second LUT. In a case where the toggle switch is switched to an on state, the processor 22 switches the second LUT originally called to the first LUT, adjusts the initial gray scales of the input display image by using the first LUT, and outputs a color-adjusted display image through the output device 23.

In some embodiments, depending on operation modes, switching performed on display images may be performed in a one-key switching manner. For example, a whole of a display image on the display module 231 is switched from the daily office mode to the image reading mode. For example, in a case where an image displayed in an entire display region of the display module 231 satisfies a GAMMA curve, the display module 231 is in the daily office mode. In a case where the toggle switch is turned on, the image displayed in the entire display region of the display module 231 may be switched from satisfying a GAMMA curve to satisfying the DICOM GSDF curve. In this case, the display module 231 switches from the daily office mode to the image reading mode.

In some other embodiments, different display regions of the display module 231 may be set to be in different working modes. That is, images displayed in the different display regions of the display module 231 satisfy different tone curves. For example, an image displayed in a left display region (a first display region) of the display module 231 meets the GAMMA standard, and the left display region of the display module 231 is in the daily office mode; and an image displayed in a right display region (a second display region) of the display module 231 meets the DICOM GSDF standard, and the right display region of the display module 231 is in the image reading mode. For example, one or more toggle switches may be provided on the display apparatus 20. In a case where a corresponding toggle switch is turned on, a preset display region of the display module 231 may be switched from the daily office mode to the image reading mode.

Figure 6A:
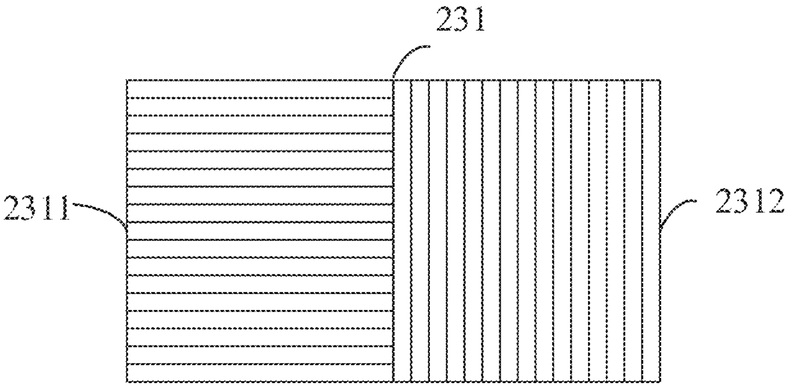
FIG. 6A is a schematic diagram of a display module, in accordance with some embodiments.
Figure 6B:
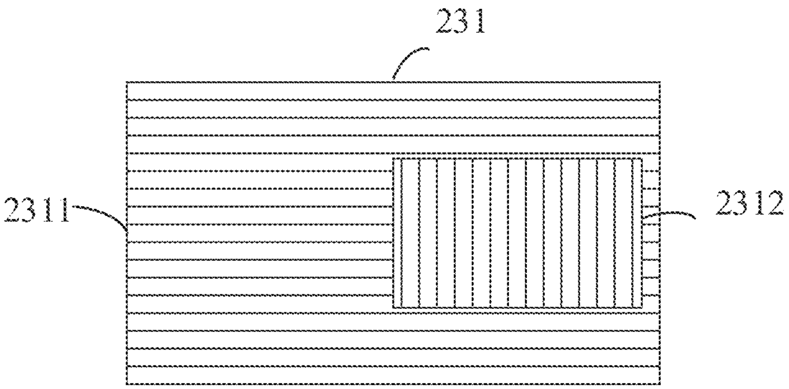
FIG. 6B is a schematic diagram of another display module, in accordance with some embodiments.

In some embodiments, as shown in FIGS. 6A and 6B, the display module 231 may be divided into a first display region 2311 and a second display region 2312. The processor 22 is configured to adjust initial gray scales of a display image in the first display region 2311 of the display module 231 by using the first LUT and adjust initial gray scales of a display image in the second display region 2312 of the display module 231 by using the second LUT.

For example, the processor 22 may determine a pixel point of the input display image, adjust an initial gray scale of the pixel point by using the first LUT in a case where the pixel point is a pixel point in the first display region 2311, and adjust an initial gray scale of the pixel point by using the second LUT in a case where the pixel point of the input image is a pixel point in the second display region 2312. The first display region 2311 outputs a display image adjusted by using the first LUT, and the second display region 2312 outputs a display image adjusted by using the second LUT.

For example, the first display region 2311 is non-overlapping with the second display region 2312, and a display image on the display module 231 may be completely divided by the first display region 2311 and the second display region 2312. The expression of being completely divided may be understood as that, the first display region 2311 and the second display region 2312 jointly occupy an entire display region of the display module 231.

For example, a display image of the display module 231 may be divided left and right, up and down, or in other ways by the first display region 2311 and the second display region 2312. The first display region 2311 and the second display region 2312 may be set by factory default, users' own setting or other manners, which are not limited in embodiments of the present disclosure.

FIG. 6A shows a manner of dividing the display region of the display module 231 in accordance with embodiments of the present disclosure. As shown in FIG. 6A, the first display region 2311 and the second display region 2312 divide the display module 231 left and right. A left side of the display module 231 is the first display region 2311, and a right side of the display module 231 is the second display region 2312. The first display region 2311 and the second display region 2312 completely divide the display module 231. In some examples, an area of the first display region 2311 is equal to an area of the second display region 2312.

FIG. 6B shows another manner of dividing the display region of the display module 231 in accordance with embodiments of the present disclosure. As shown in FIG. 6B, the first display region 2311 may be a larger display region of the display module 231, and the second display region 2312 may be a smaller display region of the display module 231. The first display region 2311 and the second display region 2312 completely divide the display module 231. In some embodiments, the area of the first display region 2311 is greater than the area of the second display region 2312. The first display region 2311 may completely surround the second display region 2312.

For another example, the first display region 2311 may be a smaller display region of the display module 231, and the second display region 2312 may be a larger display region of the display module 231. The first display region 2311 and the second display region 2312 completely divide the display module 231. In some examples, the area of the first display region 2311 is less than the area of the second display region 2312. The second display region 2312 completely surrounds the first display region 2311.

As shown in FIGS. 6A and 6B, a display image in the first display region 2311 is adjusted by using the first LUT, so that a color-adjusted display image complies with the DICOM standard and meets doctors' display requirements of image reading. The second display region 2312 is adjusted by using the second LUT, so that a color-adjusted display image conforms to a GAMMA curve (e.g., a GAMMA 2.2 curve) and meets doctors' display requirements of daily offices. In this way, doctors may perform analysis and record work while observing lesions, which improves doctor's office efficiency.

For example, the display module 231 is a wide-screen display module. For example, a length-width ratio of the display region of the display module 231 is greater than or equal to 2:1. Alternatively, the length-width ratio of the display region of the display module 231 is 21:9. In this way, both the first display region 2311 and the second display region 2312 may have large display areas.

It will be noted that, in embodiments of the present disclosure, the initial gray scales of the input display image satisfy a DICOM GSDF curve after being adjusted by the first LUT, and the initial gray scales of the input display image satisfy a GAMMA curve after being adjusted by using the second LUT. However, in embodiments of the present disclosure, adjustment of display images in the first display region 2311 and the second display region 2312 is not limited to the two tone curves above, and may be performed according to other tone curves. Embodiments of the present disclosure do not limit this. For example, the first LUT used in the embodiments of the present disclosure may be replaced with a third LUT different from the first LUT and the second LUT, and thus switching between a display mode corresponding to the third LUT and a display mode (where color-adjusted display images meet the GAMMA curve) corresponding to the second LUT is achieved.

In some embodiments, as shown in FIG. 2, the display apparatus 20 further includes a luminance sensing device 24. The luminance sensing device 24 is coupled to the processor 22, and configured to detect an actual display luminance value on a display side of the display module 231. The processor 22 is further configured to: determine a luminance variation on the display side of the display module 231 (i.e., determine whether the actual display luminance value on the display side of the display module 231 is within a first threshold range) according to the actual display luminance value on the display side of the display module 231, and adjust the actual display luminance value of the display module 231 in a case where the actual display luminance value of the display module 231 is not within the first threshold range.

For example, as use time of a liquid crystal display module increases, a luminance of a display image gradually decreases. This results in a deviation in an actual display luminance of the display image. Consequently, the display image of the display module 231 cannot meet the DICOM GSDF standard.

In light of this, the display apparatus 20 provided by the embodiments of the present disclosure detects the luminance value on the display side of the display module 231 through the luminance sensing device 24, and adjust the actual display luminance of the display module 231 timely in a case where the actual display luminance value of the display module 231 is detected to be not within the first threshold range, so that luminance consistency of the display image is ensured.

The actual display luminance value of the display module 231 being not within the first threshold range may be understood to mean that, an actual luminance value for a specific gray scale at which the display module 231 performs display is not within the first threshold range. The specific gray scale may be a maximum gray scale. For example, in a case where the display module 231 is 8-bit, the actual display luminance value of the display module 231 may be an actual luminance value for a 255th gray scale; or in a case where the display module 231 is 10-bit, the actual display luminance value of the display module 231 may be an actual luminance value for a 1023rd gray scale.

The actual display luminance value of the display module 231 being within the first threshold range may be understood to mean that, an actual luminance value corresponding to a specific gray scale at which the display module 231 performs display is within the first threshold range. The specific gray scale may be a maximum gray scale.

The first threshold range may ensure that, an image displayed by the display module 231 meets a specific display standard in a case where the luminance on the display side of the display module 231 fluctuates. For example, in a case where a value of the luminance on the display side of the display module 231 changes within the first threshold range, the image displayed by the display module 231 meets the DICOM GSDF standard. Embodiments of the present disclosure do not limit a magnitude of the first threshold range. The first threshold range depends on a standard it follows.

For example, the processor 22 does not need to adjust an actual display luminance value of the display module 231 for each gray scale. In a case where the actual luminance value for the specific gray scale at which the display module 231 performs display is within the first threshold range, actual display luminance values of other gray scales are changed accordingly, so that an image actually displayed by the display module 231 meets a corresponding standard (e.g., the DICOM GSDF standard).

In some examples, the luminance sensing device 24 is used for detecting an actual luminance value on the display side of the display module 231 for a maximum gray scale. In a case where the actual luminance value corresponding to the maximum gray scale is not within the first threshold range, the processor 22 adjusts an actual luminance value on the display side of the display module 231 for each gray scale.

For example, the display module 231 is a liquid crystal display module, and the display module 231 includes a liquid crystal display panel and a backlight source located on a light incident side of the liquid crystal display panel. The display apparatus 20 adjusts an actual display luminance value of the display module 231 by adjusting a duty cycle of a pulse width modulation (PWM) signal applied on a light-emitting element of the backlight source. For example, the backlight source includes an LED light source. For example, in a case where the display apparatus 20 determines that the actual display luminance value of the display module 231 is not within the first threshold range and less than any value in the first threshold range, the duty cycle of the PWM signal applied on the light-emitting element on the display side of the display module 231 corresponding to each gray scale is increased, so that the actual display luminance value of the display module 231 is increased, which ensures that the actual display luminance value of the display module 231 meets requirements of a relevant display standard.

For example, since a luminance of a transmissive liquid crystal display module is contributed by a backlight source, the luminance sensing device 24 may detect a light-emitting luminance of the backlight source so as to determine whether the light-emitting luminance is within a second threshold range. In a case where the light-emitting luminance is not within the second threshold range, the display apparatus 20 may adjust the luminance of the backlight source to be within the second threshold range. It will be noted that, the detection of the light-emitting luminance of the backlight source may be performed by directly detecting light emitted by the backlight source or detecting light emitted from a specific position in the backlight source or detecting light emitted by a light-emitting element of the backlight source. Embodiments of the present disclosure do not limit a detection position of the luminance sensing device 24. It will be understood that, as a detection position in the backlight source for the luminance sensing device 24 is different, a corresponding second threshold range may be different, as long as it is ensured that a set second threshold range corresponds to a standard which an actual display of the display module 231 needs to meet.

Figure 7:
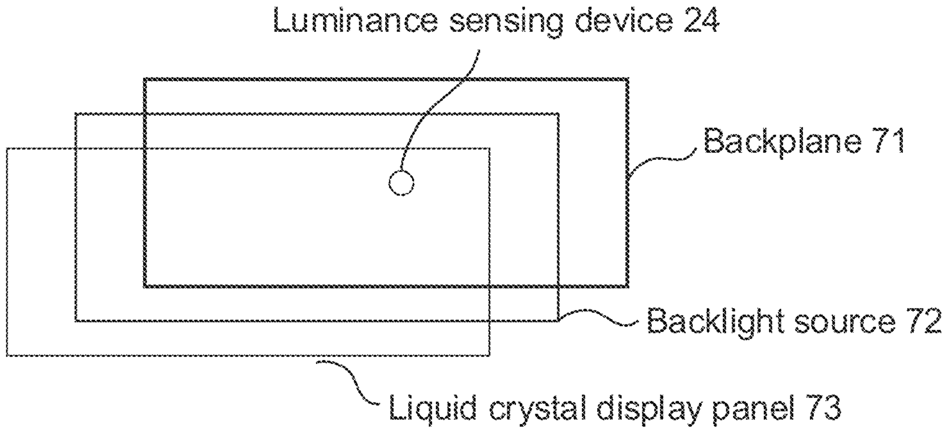
FIG. 7 is a schematic diagram showing a luminance sensing device, in accordance with some embodiments.

In some embodiments, the display module 231 is a liquid crystal display module. As shown in FIG. 7, the display module 231 may include a backplane 71, a backlight source 72 and a liquid crystal display panel 73 that are stacked. The backplane 71 includes a groove or a through hole. The luminance sensing device 24 may be located in the groove or the through hole and using for sensing an intensity of light emitted by the backlight source 72.

For example, the groove is located on a side of the backplane 71 facing the backlight source 72, and using for accommodating the luminance sensing device 24. For example, the luminance sensing device 24 is not protruded from the side of the backplane 71 facing the backlight source 72. For example, the luminance sensing device 24 is located in the through hole of the backplane 71.

For example, the groove or the through hole is located in a central region of the backplane 71, so that accuracy of a luminance variation data of the display panel 43 detected by the luminance sensing device 24 is ensured.

For example, the luminance sensing device 24 is disposed adjacent to the backlight source 72, so that the accuracy of the luminance variation data of the display panel 43 detected by the luminance sensing device 24 is ensured. For example, the luminance sensing device 24 is disposed to be closely attached to the backlight source 72.

For example, the backlight source 72 is a side-type backlight source or a direct-type backlight source.

The luminance sensing device 24 may be arranged in other ways, which is not limited in embodiments of the present disclosure.

As shown in FIG. 4, the luminance sensing device 24 is coupled to the system board 41. For example, the luminance sensing device 24 may be connected to an external device interface 48 through an inter-integrated circuit (I2C) interface to implement communication with the system board 41. The external device interface 48 may include a general-purpose input/output (GPIO), a peripheral interface, a universal serial bus (USB) interface, etc. The MCU 411 reads data obtained by the luminance sensing device 24. In a case where it is detected that the actual luminance of the display panel 43 is not within the first threshold range, the MCU 411 adjusts a duty cycle of a PWM signal applied on a self-light-emitting element of the display module 231 so as to ensure that an actual display of the display module 231 meets requirements of a corresponding standard. As an implementation, in a case where the display module 231 is a liquid crystal display module, the system board 41 may further include a backlight control interface. The MCU 411 adjusts the duty cycle of the PWM signal applied on the light-emitting element of the display module 231 by controlling the backlight control interface.

In some embodiments, as shown in FIG. 2, the display apparatus 20 further includes a luminance collection device 25. The luminance collection device 25 is coupled to the processor 22, and configured to collect a luminance value in an environment where the display side of the display module 231 is located. The processor 22 is further configured to adjust an actual display luminance value of the display module 231 according to the luminance value in the environment where the display side of the display module 231 is located.

The luminance value in the environment where the display side of the display module 231 is located may be understood as an intensity of ambient light received on the display side of the display module.

For the display module 231, e.g., an LCD module, not only does the display luminance decrease with using time, but there are also varying degrees of display differences because of variations in the environment where the display module 231 is used. For medical display modules, it is necessary to minimize an impact of ambient light on display. Therefore, environmental information on the display side of the display module 231 needs to be collected so as to adjust the luminance on the display side of the display module 231 according to different environmental information, so that it is ensured that a luminance received by human eyes remains substantially unchanged.

For example, the processor 22 adjusts the actual display luminance of the display module 231 according to an ambient luminance collected by the luminance collection device 25, so that it is ensured that a total luminance of light projected from a light exit side (i.e., the display side) of the display module 231 is substantially unchanged. The total luminance of the light projected from the display side of the display module 231 may be understood as a sum of a luminance of light emitted from the display side of the display module 231 and a luminance of light generated from reflection or scattering of the ambient light on the display module 231.

A variation of the total luminance of the light projected from the light exit side of the display module 231 is in a range of less than or equal to 5%. In this case, it may be considered that the total luminance of the light projected from the light exit side of the display module 231 is substantially unchanged. Within such a range, the luminance received by human eyes remains substantially unchanged. For example, the variation of the total luminance of light projected from the light exit side of the display module 231 may be configured to be in a range of less than or equal to 2%. For example, in a case where the display module 231 displays according to the DICOM GSDF standard, the variation of the total luminance of light projected from the light exit side of the display module 231 may be configured to be in the range of less than or equal to 2%.

The total luminance of light projected from the light exit side of the display module 231 may be understood as a sum of an actual luminance presented on the display side of the display module 231 for a specific gray scale and the luminance of the light generated from reflection or scattering of the ambient light on the display module 231. Here, the specific gray scale may be, for example, a maximum gray scale (a gray scale of 255 for an 8-bit display) or a minimum gray scale (a gray scale of 0 for an 8-bit display).

In a case where a luminance of the ambient light increases, the processor 22 is configured to reduce the actual display luminance of the display module 231; and in a case where the luminance of the ambient light reduces, the processor 22 is configured to increase the actual display luminance of the display module 231. Since the processor 22 adjusts the actual display luminance of the display module 231 according to the luminance of the ambient light collected by the luminance collection device 25, it may be ensured that images displayed by the display module 231 meets a specific display standard, e.g., the DICOM GSDF standard, in a case where a deviation between a luminance of the environment where the display side of the display module 231 is located and the actual display luminance on the display side of the display module 231 fluctuates.

For example, the adjustment of the actual display luminance of the display module 231 may be that, a luminance of a display image of the display module 231 for each gray scale is adjusted, and a luminance ratio between a red sub-pixel, a green sub-pixel and a blue sub-pixel of each pixel remains unchanged. This means that a proportional relationship between gains of a red color, a green color and a blue color for each pixel remains unchanged.

For example, in a case where the display module 231 is a liquid crystal display module, the actual display luminance of the display module 231 may be adjusted by adjusting a light-emitting luminance of the backlight source of the display module 231.

Figure 8:
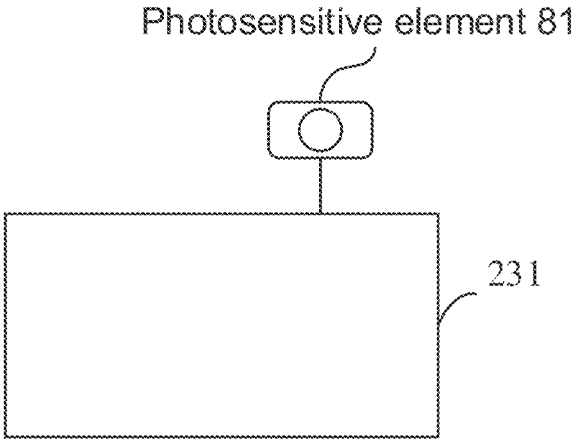
FIG. 8 is a schematic diagram showing a luminance collection device, in accordance with some embodiments.

For example, as shown in FIG. 8, the luminance collection device 25 may include a photosensitive element 81. The photosensitive element 81 may be disposed above the display module 231. However, a position of the photosensitive element 81 may be determined according to requirements. In a case where it is necessary to collect the luminance of the ambient light, the photosensitive element 81 starts to detect a luminance of the ambient light on a side of the photosensitive element 81 facing the display module 231. Embodiments of the present disclosure do not limit a type of the photosensitive element 81. The photosensitive element 81 may be, for example, a luminance sensor or a camera.

For example, the display module 231 is a liquid crystal display module, and the display module 231 includes a liquid crystal display panel and a backlight source located on a light incident side of the liquid crystal display panel. The display apparatus 20 adjusts the actual display luminance of the display module 231 by adjusting a duty cycle of a PWM signal applied on a light-emitting element of the backlight source.

For example, in a case where the luminance of the ambient light collected by the luminance collection device 25 increases by 10 nits, the duty cycle of the PWM signal applied on the light-emitting element of the backlight source may be reduced by 1%, so that it is ensured that the luminance received by human eyes remains substantially unchanged.

For example, the luminance collection device 25 may be set to periodically, e.g., once every other week, collect the luminance of the environment light on the display side of the display module 231, so that a luminance of the display module 231 may be calibrated periodically.

Figure 9:
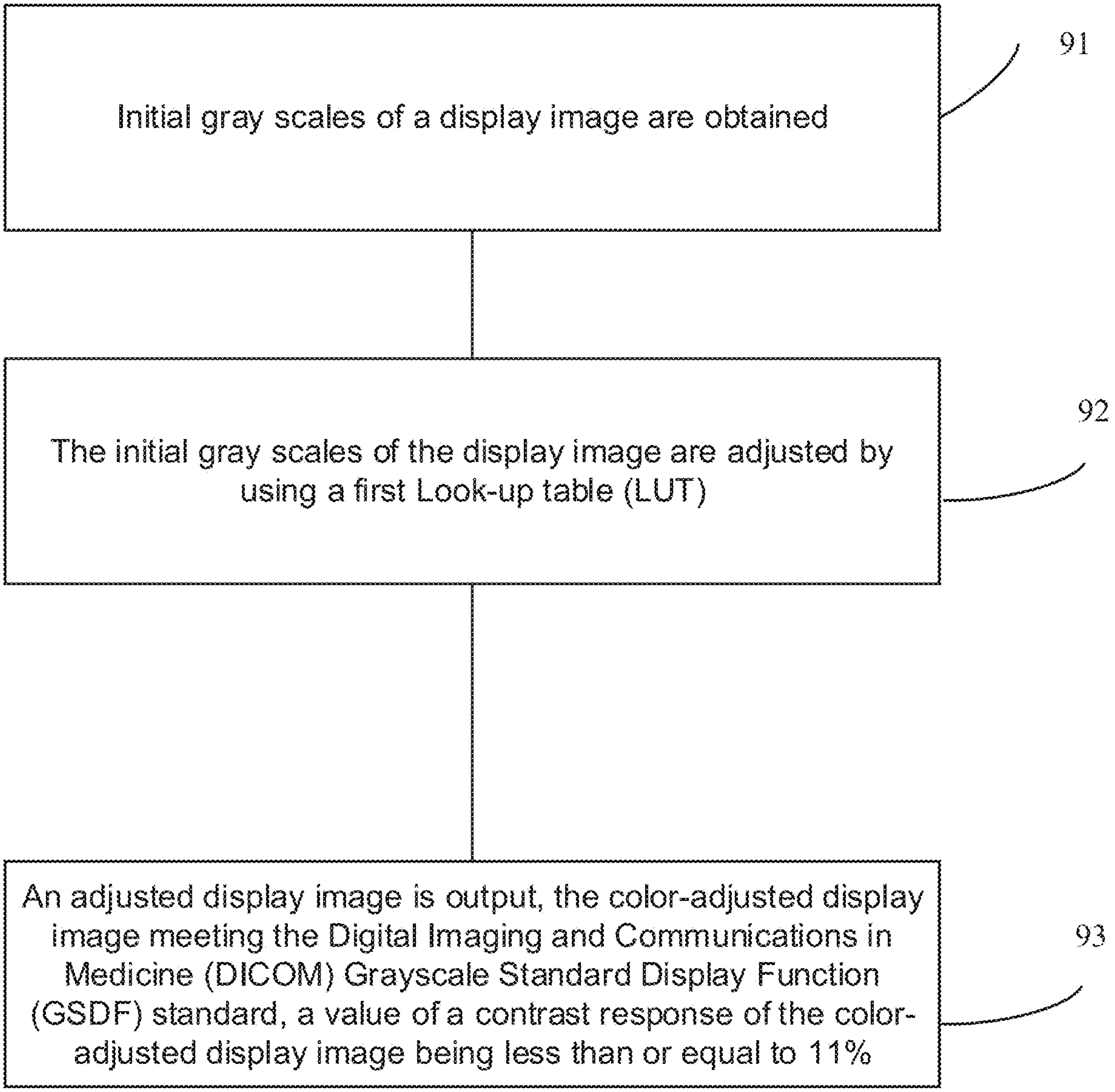
FIG. 9 is a flow chart of a luminance adjustment method for a display apparatus, in accordance with some embodiments.

Embodiments of the present disclosure provide a luminance adjustment method for a display apparatus. As shown in FIG. 9, the display apparatus is any one of the display apparatuses in the above embodiments. The luminance adjustment method includes steps 91 to 93.

In a step 91, initial gray scales of a display image are obtained.

In a step 92, the initial gray scales of the display image are adjusted by using a first LUT.

In a step 93, a color-adjusted display image is output. The color-adjusted display image meets the DICOM GSDF standard, and a value of a contrast response of the color-adjusted display image is less than or equal to 11%.

In some embodiments, the first LUT includes at least one first LUT value. The first LUT value satisfies the following relationship:

$$K(j) = \left(L(j) - \frac{L_{min} * (1 - j/j_{max})}{L_{max}}\right)^{\frac{1}{\alpha}} * j_{max}, \text{ and} \tag{1-1}$$

$$T(j) = \frac{K(j)}{2^{X-X'}}, \tag{1-2}$$

where j=0, 1, 2, . . . , or N−1, $N=2^X$, T(j) is a first LUT value in the first LUT corresponding to a j-th gray scale, L(j) is a luminance value for the j-th gray scale obtained based on $L_{min}$ and $L_{max}$ in accordance with the DICOM GSDF standard, K(j) is a placeholder value for calculation of T(j), $L_{min}$ is a minimum luminance value of the display module, and $L_{max}$ is a maximum luminance value of the display module, j is a gray scale value of the j-th gray scale for the first LUT, $j_{max}$ is a maximum gray scale value for the first LUT, X is a bit number callable for the processor, and X' is a bit number of the display module, and α is a correction coefficient.

In some embodiments, the correction coefficient α is in a range of 2.225 to 2.245, inclusive.

In some embodiments, the correction coefficient α is in a range of 2.230 to 2.240, inclusive.

In some embodiments, a value of the correction coefficient α is 2.235.

In some embodiments, the bit number callable for the processor is greater than or equal to the bit number of the display module.

In some embodiments, the bit number callable for the processor is 10, and the bit number of the display module is 8 or 10.

In some embodiments, the luminance adjustment method further includes: in a case where a bit number of the color-adjusted display image is inconsistent with the bit number of the display module 231, changing the bit number of the color-adjusted display image to cause the bit number of the color-adjusted display image to be equal to the bit number of the display module 231.

In some embodiments, the luminance adjustment method further includes: in a case where a bit number of an input display image is inconsistent with the bit number callable for the processor 22, changing the bit number of the input display image to cause the bit number of the input display image to be equal to the bit number callable for the processor 22.

In some embodiments, the luminance adjustment method further includes: adjusting the initial gray scales of the display image by using a second LUT, the second LUT being different from the first LUT.

In some embodiments, the second LUT enables a color-adjusted display image to satisfy a GAMMA curve.

In some embodiments, the luminance adjustment method further includes: switching between the first LUT and the second LUT, and adjusting the initial gray scales of the display image by using the first LUT or the second LUT.

In some embodiments, adjusting the initial gray scales of the display image by using the first LUT or the second LUT includes: adjusting initial gray scales of a display image in a first display region of the display module 231 by using the first LUT, and adjusting initial gray scales of a display image in a second display region of the display module 231 by using the second LUT.

In some embodiments, adjusting the initial gray scales of the display image in the first display region of the display module 231 by using the first LUT includes: determining a pixel point of an input display image, and adjusting an initial gray scale of the pixel point by using the first LUT if the pixel point is a pixel point in the first display region 2311. Adjusting the initial gray scales of the display image in the second display region of the display module 231 by using the second LUT includes: determining a pixel point of an input display image, and adjusting an initial gray scale of the pixel point by using the second LUT if the pixel point of the input image is a pixel point in the second display region 2312.

In some embodiments, the first display region is non-overlapping with the second display region, and a display image of the display module 231 is completely divided by the first display region and the second display region.

In some embodiments, the luminance adjustment method further includes: detecting a luminance value on a display side of the display module 231, determining a luminance variation on the display side of the display module 231 according to the luminance value on the display side of the display module 231, and adjusting a luminance for each gray scale of the display module 231 if the luminance variation on the display side of the display module 231 is greater than a first threshold.

In some embodiments, K(j) is a result by a rounding operation of an actual calculated value on a right side of an equal sign in formula (1-1), and the rounding operation is performed at a first decimal place, a second decimal place, or a third decimal place of the actual calculated value on the right side of the equal sign in formula (1-1).

In some embodiments, the luminance adjustment method further includes: collecting a luminance value in an environment where the display side of the display module 231 is located, and adjusting an actual display luminance value of the display module 231 according to the luminance value in the environment where the display side of the display module 231 is located.

Some embodiments of the present disclosure provide a computer-readable storage medium (e.g., a non-transitory computer-readable storage medium). The computer-readable storage medium has stored computer program instructions. When executed on a computer (e.g., a display apparatus), the computer program instructions cause the computer to perform the luminance adjustment method for a display apparatus as described in any one of the above embodiments.

For example, the computer-readable storage medium may include, but is not limited to a magnetic storage device (e.g., a hard disk, a floppy disk or a magnetic tape), an optical disk (e.g., a compact disk (CD), or a digital versatile disk (DVD)), a smart card and a flash memory device (e.g., an erasable programmable read-only memory (EPROM), a card driver, a stick driver or a key driver). Various computer-readable storage media described in the present disclosure may represent one or more apparatus and/or other machine-readable storage medium for storing information. The term "computer-readable storage medium" may include, but is not limited to wireless channels and various other media capable of storing, containing and/or carrying instructions and/or data.

Some embodiments of the present disclosure provide a computer program product. For example, the computer program product is stored on a non-transitory computer-readable storage medium. The computer program product includes computer program instructions. When executed on a computer (e.g., a display apparatus), the computer program instructions cause the computer to perform the luminance adjustment method for a display apparatus as described in the above embodiments.

Some embodiments of the present disclosure provide a computer program. When executed on a computer (e.g., a display apparatus), the computer program causes the computer to perform the luminance adjustment method for a display apparatus as described in the above embodiments.

Beneficial effects of the computer-readable storage medium, the computer program product and the computer program are the same as the beneficial effects of the luminance adjustment method for a display apparatus described in the above embodiments, which will not be repeated here.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display apparatus, comprising:

an input device, configured to obtain initial gray scales of a display image;

a processor, coupled to the input device and configured to adjust the initial gray scales of the display image by using a first display data look-up table (LUT); and an output device, including a display module, the output device being coupled to the processor and configured to output a color-adjusted display image, the color-adjusted display image meeting the Digital Imaging and Communications in Medicine (DICOM) Grayscale Standard Display Function (GSDF) standard, and a value of a contrast response of the color-adjusted display image being less than or equal to 11%, wherein the first LUT includes at least one first LUT value, and the at least one first LUT value satisfies a following relationship:

$$K(j) = \left(L(j) - \frac{L_{min} * (1 - j/j_{max})}{L_{max}}\right)^{\frac{1}{\alpha}} * j_{max}, \text{ and} \quad (1\text{-}1)$$

$$T(j) = \frac{K(j)}{2^{X-X'}}, \quad (1\text{-}2)$$

wherein j=0, 1, 2, . . . , or N−1, $N=2^X$, T(j) is a first LUT value in the first LUT corresponding to a j-th gray scale, L(j) is a luminance value for the j-th gray scale obtained based on $L_{min}$ and $L_{max}$ according to the DICOM GSDF standard, K(j) is a placeholder value for calculation of T(j), $L_{min}$ is a minimum luminance value of the display module, $L_{max}$ is a maximum luminance value of the display module, $j_{max}$ is a maximum gray scale value for the first LUT, X is a bit number callable for the processor, X' is a bit number of the display module, and α is a correction coefficient.

2. The display apparatus according to claim 1, wherein the correction coefficient α is in a range of 2.225 to 2.245, inclusive.

3. The display apparatus according to claim 1, wherein the bit number callable for the processor is greater than or equal to the bit number of the display module.

4. The display apparatus according to claim 3, wherein the bit number callable for the processor is 10, and the bit number of the display module is 8 or 10.

5. The display apparatus according to claim 1, further comprising:

a signal converter, located in the processor or the output device or coupled to the processor and the output device, the signal converter being configured to: in a case where a bit number of the color-adjusted display image is inconsistent with a bit number of the display module, change the bit number of the color-adjusted display image to cause the bit number of the color-adjusted display image to be equal to the bit number of the display module.

6. The display apparatus according to claim 1, further comprising:

a gray scale converter, located in the processor or the input device or coupled to the input device and the processor, the gray scale converter being configured to: in a case where a bit number of an input display image is inconsistent with a bit number callable for the processor, change the bit number of the input display image to cause the bit number of the input display image to be equal to the bit number callable for the processor.

7. The display apparatus according to claim 1, wherein the processor is further configured to adjust the initial gray scales of the display image by using a second LUT, the second LUT being different from the first LUT.

8. The display apparatus according to claim 7, wherein the second LUT enables a color-adjusted display image to satisfy a GAMMA curve.

9. The display apparatus according to claim 7, wherein the processor is further configured to: switch between the first LUT and the second LUT, and adjust the initial gray scales of the display image by using the first LUT or the second LUT.

10. The display apparatus according to claim 7, wherein the processor is configured to: adjust initial gray scales of a display image in a first display region of the display module by using the first LUT, and adjust initial gray scales of a display image in a second display region of the display module by using the second LUT.

11. The display apparatus according to claim 10, wherein the first display region is non-overlapping with the second display region, and the display image on the display module is completely divided by the first display region and the second display region.

12. The display apparatus according to claim 1, further comprising:

a luminance sensing device, coupled to the processor and configured to detect an actual display luminance value on a display side of the display module, wherein the processor is further configured to: determine whether the actual display luminance value on the display side of the display module is within a first threshold range; and adjust the actual display luminance value on the display side of the display module in a case where the actual display luminance value on the display side of the display module is not within the first threshold range.

13. The display apparatus according to claim 1, further comprising:

a luminance collection device, coupled to the processor and configured to collect a luminance value of light in an environment where a display side of the display module is located, wherein the processor is further configured to adjust an actual display luminance of the display module according to the luminance value of the light in the environment where the display side of the display module is located.

14. The display apparatus according to claim 13, wherein the processor is configured to adjust a duty cycle of a pulse width modulation (PWM) signal applied on a light-emitting element of the display module corresponding to each gray scale.

15. The display apparatus according to claim 12, wherein the processor is configured to adjust a duty cycle of a pulse width modulation (PWM) signal applied on a light-emitting element of the display module corresponding to each gray scale.

16. A luminance adjustment method for a display apparatus, comprising:

obtaining initial gray scales of a display image;

adjusting the initial gray scales of the display image by using a first display data lookup table (LUT); and outputting a color-adjusted display image, the color-adjusted display image meeting the Digital Imaging and Communications in Medicine (DICOM) Grayscale Standard Display Function (GSDF) standard, and a value of a contrast response of the color-adjusted display image being less than or equal to 11%, wherein the first LUT includes at least one first LUT value, and the at least one first LUT value satisfies a following relationship:

$$K(j) = \left(L(j) - \frac{L_{min} * (1 - j/j_{max})}{L_{max}}\right)^{\frac{1}{\alpha}} * j_{max}, \text{ and} \quad (1\text{-}1)$$

$$T(j) = \frac{K(j)}{2^{X-X'}}, \quad (1\text{-}2)$$

where i=0, 1, 2, . . . , or N−1, $N=2^X$, T(j) is a first LUT value in the first LUT corresponding to a j-th gray scale, L(j) is a luminance value for the j-th gray scale obtained based on $L_{min}$ and $L_{max}$ in accordance with the DICOM GSDF standard, K(j) is a placeholder value for calculation of T(j), $L_{min}$ is a minimum luminance value of a display module of an output device in the display apparatus, $L_{max}$ is a maximum luminance value of the display module, $j_{max}$ is a maximum gray scale value for the first LUT, X is a bit number callable for a processor of the display apparatus, X' is a bit number of the display module, and α is a correction coefficient.

17. The method according to claim 16, further comprising:

switching between the first LUT and a second LUT; and adjusting the initial gray scales of the display image by using the first LUT or the second LUT, the second LUT enabling an adjusted image to satisfy a GAMMA curve.

18. The method according to claim 16, wherein K(j) is a result by a rounding operation of an actual calculated value on a right side of an equal sign in formula (1-1), and the rounding operation is performed at a first decimal place, a second decimal place, or a third decimal place of the actual calculated value on the right side of the equal sign in formula (1-1).

* * * * *